2,970,050

PROCESS FOR REMOVING NOBLE METALS FROM URANIUM

James B. Knighton, Nixon, N.J., assignor to the United States of America as represented by the United States Atomic Energy Commission No Drawing. Filed July 22, 1958, Ser. No. 750,276

2 Claims. (Cl. 75—84.1)

This invention relates to a pyrometallurgical method for processing nuclear materials. In more detail the invention relates to a process for removing noble metals and particularly ruthenium from uranium which has been used as a core or blanket material in a nuclear reactor.

Pyrometallurgical methods for processing nuclear materials are potentially of great importance because they lend themselves to continuous and remote operation while the valuable material is maintained in a compact metallic form which is processed with radiation-damage-resistant materials. Zinc is particularly useful as a solvent in these processes because high-purity zinc is readily available, it has a relatively low melting point, and all common metals are sufficiently soluble in zinc that an entire core or blank element can be dissolved in a single operation.

A process for purifying uranium employing zinc as solvent is disclosed in copending patent application Serial No. 665,105, filed June 11, 1957, now Patent No. 2,922,771, issued on January 26, 1960, in the names of Leslie Burris, Jr., James B. Knight and Harold M. Feder.

It will be noted that ruthenium is removed from uranium only with difficulty by following the procedure outlined in that application. The present invention is particularly applicable as a preliminary step before carrying out the procedure outlined in that application to remove ruthenium and other noble metals from uranium.

Ruthenium and other noble metals are fission products which are present in uranium which has been irradiated in a nuclear reactor where the uranium may have been present in a fuel element in the core or in a blanket element around the core. Relatively small amounts of each of these fission products are formed in the core or blanket material. In order to promote radiation stability of the fuel or blanket elements, the element may be originally formed with a small amount (on the order of a few percent) of certain of the fission product elements originally present. Formation of a relatively small amount of fission products in these elements does not cause the radiation damage therein that would be caused in an element not having this extra material present.

The amount of the fission products present in the reactor, of course, builds up with operation of the reactor. The excess fission products over that originally present must be removed before the concentration thereof builds up to a point where they interfere with operation of the reactor. This invention shows how certain of these fission products can be removed in sufficient quantity to prevent build-up in the reactor.

It is accordingly an object of the present invention to provide a method for processing uranium-base nuclear materials.

It is a more specific object of the present invention to provide a method for removing noble metals from irradiated uranium.

It is a still more specific object of the present invention to provide a method for removing ruthenium from uranium by a pyrometallurgical method.

These and other objects of the present invention are attained by my novel method which includes the steps of disintegrating the uranium-containing nuclear material into powdered metal, oxidizing this material, and extracting the noble metals therefrom with molten zinc.

One method of disintegrating the nuclear material which is particularly suitable consists of hydriding and then dehydriding the uranium or uranium alloy. To accomplish this the metal is held in a hydrogen atmosphere at a proper temperature and pressure to form $UH_3$. The metal has been hydrided when it becomes a powder. Since the hydrogen in the hydride is in equilibrium with the hydrogen in its atmosphere, the compound may be dehydrided by pumping the hydrogen from around the hydride while heating the hydride. Uranium in powdered form remains.

Since uranium is quite reactive, it will oxidize readily in air. Therefore the powder can be oxidized by contacting it with air. As is evident from the title, the noble elements are not readily oxidized and therefore are not substantially oxidized by mere contact with air. Thus a powder is obtained which consists in large part of uranium oxide and the noble metals in unoxidized form.

According to the present invention, the noble metals can then be extracted by molten zinc since the metals are somewhat soluble therein while metal oxides are not. The zinc also serves to reduce any of the noble metal oxides which may have been formed.

A specific example follows. A sample (9.5 grams) of a synthetic alloy containing 91.46% uranium, 2.97% ruthenium, 3.73% molybdenum, 1.03% zirconium, and .81% palladium was hydrided by heating it at 300° C. for 21 hours under 10 pounds hydrogen pressure, dehydrided by heating it to 350° C. under a vacuum, and oxidized by contacting it with air. This sample simulates the core material to be used in the Experimental Breeder Reactor #2. Zinc was added and mixed to reduce and take into solution the noble metals. A filtered sample showed that 34.3% of the total ruthenium and 0.4% of the total uranium went into solution at this point. The solubility of ruthenium is thus ample to reduce the amount of ruthenium in the element down to that amount desired for reasons of radiation stability.

Next magnesium was added and, after mixing, a filtered sample showed 96.3% of the total ruthenium and 77.1% of the total uranium to be in solution. Thus it was shown that the uranium can be reduced with magnesium to put it into solution after the noble metals are removed. The temperature of these reactions was 750° C. Although analytical results are shown only for ruthenium because this is the difficult compound to remove, other noble metals are also removed. Of the elements ruthenium, molybdenum, zirconium and palladium in the alloy, only zirconium is not removed by this procedure.

These results show the feasibility of selective reduction of noble metals from uranium oxide powder and of uranium recovery by magnesium reduction in zinc solution. It will be appreciated that no attempt was made to determine optimum conditions and that it is probable that very much more complete separation can be made.

It will be understood that this invention is not to be limited to the details given herein, but that it may be modified within the scope of the appended claims.

What is claimed is:

1. A pyrometallurgical method for purifying uranium containing ruthenium and palladium comprising disintegrating the uranium by hydriding and dehydriding it, oxidizing the uranium by exposing it to air, extracting the ruthenium and palladium from the oxidized uranium with molten zinc, and recovering the uranium.

2. A pyrometallurgical method for purifying uranium containing ruthenium and palladium comprising disintegrating the uranium by hydriding and dehydriding it, oxidizing the powdered uranium by exposing it to air, extracting the ruthenium and palladium therefrom with molten zinc, simultaneously reducing and dissolving the oxidized uranium with an alloy of zinc and magnesium, and recovering purified uranium.

References Cited in the file of this patent
FOREIGN PATENTS 4,426    Great Britain _____ 1876